March 8, 1927.

D. E. NORCROSS

STEERING WHEEL KNOB

Filed July 8, 1926

1,620,223

WITNESSES

Inventor
DANIEL E. NORCROSS
By Richard B. Owen, Attorney

Patented Mar. 8, 1927.

1,620,223

UNITED STATES PATENT OFFICE.

DANIEL E. NORCROSS, OF DALLAS, TEXAS.

STEERING-WHEEL KNOB.

Application filed July 8, 1926. Serial No. 121,212.

The present invention relates to attachments for vehicle steering wheels, and has particular reference to the provision of a knob adapted to facilitate the turning movement of the wheel.

Another object of the invention is the provision of a steering wheel knob designed for detachable connection with the steering wheel.

A further object of the invention is the provision of a knob for steering wheels formed so as to permit convenient manipulation of the wheel.

A still further object of the invention is the provision of a steering wheel knob of the above character which will be comparatively simple, yet durable of construction and which will be efficient for the purpose intended.

Other objects and advantages of the invention will become apparent as the description progresses.

In the accompanying drawing, forming a part of this specification and in which like reference characters are employed to designate corresponding parts throughout the same:

Figure 1:
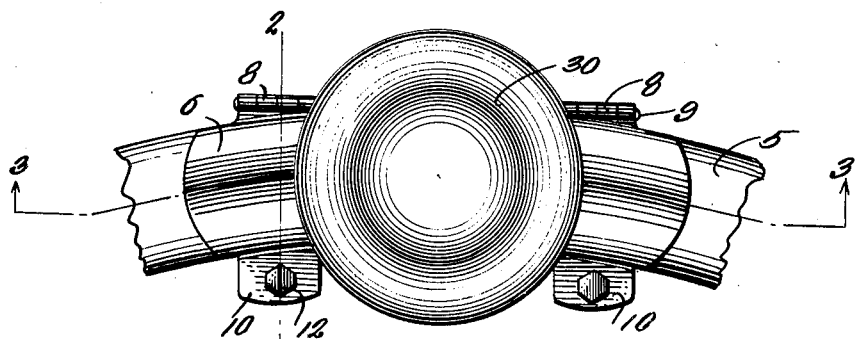
Figure 1 is a top plan view of a knob constructed in accordance with my invention shown in operative position upon the rim of a steering wheel.
Figure 2:
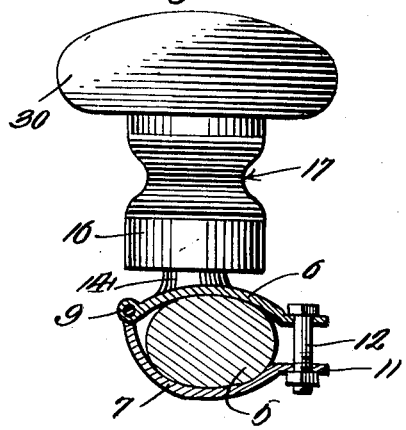
Figure 2 is a transverse sectional view taken on the line 2—2 of Figure 1.

Referring to the drawing, wherein for the purpose of illustration is shown the preferred embodiment of my invention, the numeral 5 indicates a fragmentary portion of a steering wheel rim. These rims are usually oval in cross-section as illustrated in Figure 2 of the drawing, and of circular formation.

With particular reference to the structure embodied in my invention, the numeral 5 indicates a baseplate preferably of sheet metal construction of arcuate form bent transversely to conform to the curvature of the rim 5, so as to be snugly fitted thereon. Designed for hinged connection with the baseplate 6 and formed so as to firmly embrace the lower portion of the steering wheel rim, are a pair of spaced hinge bars 7. The plate 6 and hinge bars are provided with hinge sleeves 8 arranged for interfitting aligned engagement through which a longitudinal hinge pin 9 is inserted to provide a suitable hinged connection. The opposite longitudinal edge of the plate 6 is provided with a pair of spaced laterally extending flanges 10 apertured and adapted to be disposed in spaced relation above similar flanges 11 formed on the free ends of the hinge bars 7. The flanges 11 are likewise provided with openings adapted to align with the apertures in the flanges 10 to engage securing bolts 12. From this construction, it will be readily seen that the base plate may be detachably associated with the wheel rim 5 and securely fastened to prevent displacement or rotary movement.

Mounted upon the central portion of the baseplate 6 and positioned vertically upward therefrom is a standard 13, the lower end thereof being welded or otherwise connected to the baseplate while the upper end is provided with a screw-threaded bore. This standard is machined to form an enlarged shoulder 14 at the lower extremity and reduced portions 15 adjacent the shoulder and at the upper end thereof. The central portion of the standard is further reduced in diameter to provide an intermediate shank about which is rotatably journaled a bearing sleeve 16.

This sleeve is formed with a central longitudinal bore adapted to be loosely fitted upon the center of the standard 13 and counter-bored end recesses. An exterior central groove 17 is formed in the sleeve to lighten the construction and enhance the appearance thereof.

In order that the sleeve 16 may be easily rotated upon the standard 13 suitable bearing structures are provided. The bottom bearing embodies a flat annular bearing plate 18 having a raised bearing race 19 formed on its upper face, its upper edge being formed with a groove for the reception of ball-bearings 20. Formed so as to be snugly fitted within the lower counter-bore of the sleeve is an annular cupped-shaped bearing member 21, provided with a central opening to clear the standard and designed to rest upon the ball-bearings 20 to take the downward thrust of the sleeve. A similar cup-shaped bearing member 22 is tightly fitted in the upper counter-bore of the sleeve and is provided with a lateral annular flange 23. Ball-bearings 24 are positioned in the member 22 and are held against displacement by means of a bearing cap 25. This cap is composed of a disc-shaped head 26, provided with a transverse groove 27 in its upper face, adapted for engagement with a screw-driver or similar implement. Formed on the lower face of the member 25 is a downwardly projecting circular flange 28, disposed adjacent the outer peripheral edge of the cap and having a groove formed in its lower edge designed for suitable engagement with the ball-bearings 24. This cap is also provided with a central downwardly projecting threaded bolt 29, adapted to be threadedly mounted in the bore of the standard so as to maintain the sleeve and bearing structures in proper position on the standard.

Figure 3:
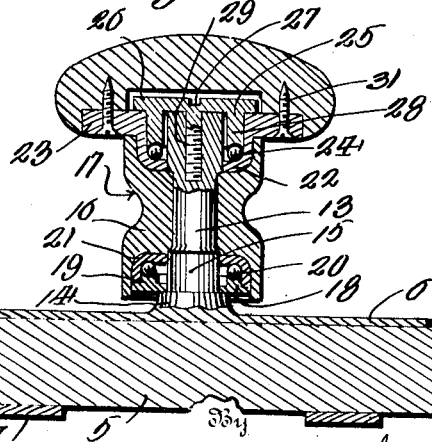
Figure 3 is a longitudinal sectional view taken on the line 3—3 of Figure 1.

Firmly secured upon the sleeve 16 and rotatable therewith is a circular head or hand plate 30 having its upper surface convexed to provide a convenient gripping surface and having its lower face recessed so as to be suitably fitted over the bearing cap 25 and flange 23, whereas the lower peripheral edge of the head 30 will extend flush with the bottom surface of the flange to present a compact and symmetrical structure. The head is secured in position by means of screws 31, extended through suitable openings in the flange 23, and screwed into the head as shown to advantage in Figure 3 of the drawing.

From the foregoing description and the drawing, it will be readily noted that a compact and durable vehicle wheel attachment has been produced, embodying an efficient as well as convenient turning knob. The device is constructed so as to be quickly and securely fastened on the rim of a steering wheel or removed therefrom when desirable. The application of this attachment will greatly facilitate the steering operation of vehicles, particularly the heavy type of passenger cars and trucks. In this device, the steering wheel may be rapidly rotated without changing the grip of the wheel, so that quick steering action is afforded.

It is to be understood that the form of my invention herein shown and described is to be taken as the preferred example of the same, and that various changes as to the shape, size and arrangement of parts may be resorted to without departing from the spirit of the invention or the scope of the subsequent claims.

Having thus described my invention, I claim:

1. A steering knob for vehicle steering wheels, comprising a plate adapted to be attached to the rim of a steering wheel, a standard secured to and projecting upwardly from said plate, a sleeve mounted for rotatable movement on the standard, the said sleeve being recessed in its upper and lower ends, an anti-friction bearing mounted in the lower end of the sleeve, a second anti-friction bearing mounted in the upper sleeve recess, a cap engageable with the standard and bearing on the upper anti-friction bearing means, and a knob, detachably mounted on the upper end of the sleeve.

2. A steering knob for vehicle steering wheels, comprising a plate adapted to be secured to the rim of a steering wheel, a standard secured to and projecting upwardly from said plate, a sleeve mounted for rotatable movement about the standard formed with annular recesses at its upper and lower ends, an anti-friction bearing mounted in the lower sleeve recess, a second anti-friction bearing mounted in the upper sleeve recess, an annular bearing plate mounted in the upper portion of the sleeve, a cap engageable with the standard to secure the sleeve in position, and a knob detachably secured to the annular bearing plate.

In testimony whereof I affix my signature.

DANIEL E. NORCROSS.